United States Patent
Mizuno

(10) Patent No.: US 11,789,223 B2
(45) Date of Patent: Oct. 17, 2023

(54) OPTICAL TRANSCEIVER MODULE FOR OPTICAL TRANSCEIVER AND OPTICAL TRANSCEIVER

(71) Applicant: SUMITOMO ELECTRIC INDUSTRIES, LTD., Osaka (JP)

(72) Inventor: Yasutaka Mizuno, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/582,294

(22) Filed: Jan. 24, 2022

(65) Prior Publication Data

US 2022/0236506 A1  Jul. 28, 2022

(30) Foreign Application Priority Data

Jan. 27, 2021 (JP) ................................ 2021-010955

(51) Int. Cl.
 *H04B 10/07* (2013.01)
 *H04B 17/00* (2015.01)
 *G02B 6/42* (2006.01)
 *H04B 10/40* (2013.01)

(52) U.S. Cl.
 CPC ......... *G02B 6/4281* (2013.01); *G02B 6/4246* (2013.01); *H04B 10/40* (2013.01)

(58) Field of Classification Search
 CPC ..... G02B 6/4281; G02B 6/4246; H04B 10/40
 See application file for complete search history.

(56) References Cited

U.S. PATENT DOCUMENTS

| | | | |
|---|---|---|---|
| 7,153,043 B1* | 12/2006 | Zhang | G02B 6/4283 385/92 |
| 9,042,735 B2* | 5/2015 | Shah | H05K 1/148 385/92 |
| 2010/0061735 A1* | 3/2010 | Minota | H05K 1/148 398/139 |
| 2019/0174620 A1* | 6/2019 | Fang | H05K 1/028 |
| 2019/0281691 A1* | 9/2019 | Matsui | G02B 6/4272 |
| 2020/0073052 A1* | 3/2020 | Lin | G02B 6/4254 |
| 2020/0150366 A1 | 5/2020 | Tittenhofer et al. | |

* cited by examiner

*Primary Examiner* — Pranesh K Barua
(74) *Attorney, Agent, or Firm* — IPUSA, PLLC

(57) ABSTRACT

An optical transceiver module includes a package containing a light receiving element, a light emitting element, and an optical modulator configured to modulate light that is output from the light emitting element, a rigid circuit board including a control circuit provided on the rigid circuit board, the control circuit being configured to control at least one of the light receiving element, the light emitting element, or the optical modulator, and a flexible circuit board including a plurality of signal wires, wherein the rigid circuit board is connected to the package via the flexible circuit board, with a first surface of the rigid circuit board facing a first surface of the package, and the at least one of the light receiving element, the light emitting element, or the optical modulator is electrically connected to the control circuit via the plurality of signal wires.

10 Claims, 10 Drawing Sheets

OPTICAL TRANSCEIVER MODULE FOR OPTICAL TRANSCEIVER AND OPTICAL TRANSCEIVER

CROSS-REFERENCE TO RELATED APPLICATIONS

This application is based on and claims priority to Japanese Patent Application No. 2021-010955, filed on Jan. 27, 2021, the entire content of which is incorporated herein by reference.

BACKGROUND OF THE INVENTION

1. Field of the Invention

Embodiments described herein generally relate to an optical transceiver module for an optical transceiver and an optical transceiver.

2. Description of the Related Art

With the increase in the amount of information transmitted on the Internet and the like, it is desired to improve the transmission speed of information on the transmission paths using optical fibers. In accordance with the demand for improving the transmission speed, it has been a crucial issue to increase the transmission capacity per rack in data centers, and it is desired to reduce the sizes of the optical transceivers that transmit and receive optical signals. For example, United States Patent Application Publication No. 2020/0150366 discloses a method for implementing an integrated coherent transmit-receive optical sub assembly (IC-TROSA) in a quad small form factor pluggable double density (QSFP-DD), which is one of the small form factors.

In a case where an optical transceiver module such as the IC-TROSA or the like is implemented in the QSFP-DD, not only photoelectric conversion components including a photoelectric conversion circuit and optical components but also control components included in control circuits for controlling the photoelectric conversion circuit are required to be accommodated in a QSFP-DD housing. Also, in the optical transceiver module, the photoelectric conversion components are arranged according to an electric interface defined by a multi-source agreement (MSA), and the optical components are arranged according to the positions of the photoelectric conversion components and the optical interface.

Therefore, the photoelectric conversion components, the optical components, and the control components are arranged in a mixed manner in the optical transceiver module, the area in which the control components are arranged is limited, and it is necessary to implement the control components with a high density in a vacant area. If a problem occurs in the control components in the optical transceiver module in which the components are implemented with a high density, it is difficult to perform rework such as replacement of the control components. Also, the optical transceiver module including the photoelectric conversion components and the optical components are hermetically sealed. If a problem occurs with components in the hermetically sealed optical transceiver module, it is difficult to rework the components. In a case where the components cannot be reworked, there would be no choice but to discard the optical transceiver module that has a problem.

SUMMARY OF THE INVENTION

Embodiments of the present invention provide an optical transceiver module that includes a package having a first surface and a second surface and containing a light receiving element, a light emitting element, and an optical modulator configured to modulate light that is output from the light emitting element, a rigid circuit board having a first surface and a second surface and including a control circuit provided on the rigid circuit board, the control circuit being configured to control at least one of the light receiving element, the light emitting element, or the optical modulator, and a flexible circuit board including a plurality of signal wires, wherein the rigid circuit board is connected to the package via the flexible circuit board, with the first surface of the rigid circuit board facing the first surface of the package, and the at least one of the light receiving element, the light emitting element, or the optical modulator is electrically connected to the control circuit via the plurality of signal wires.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
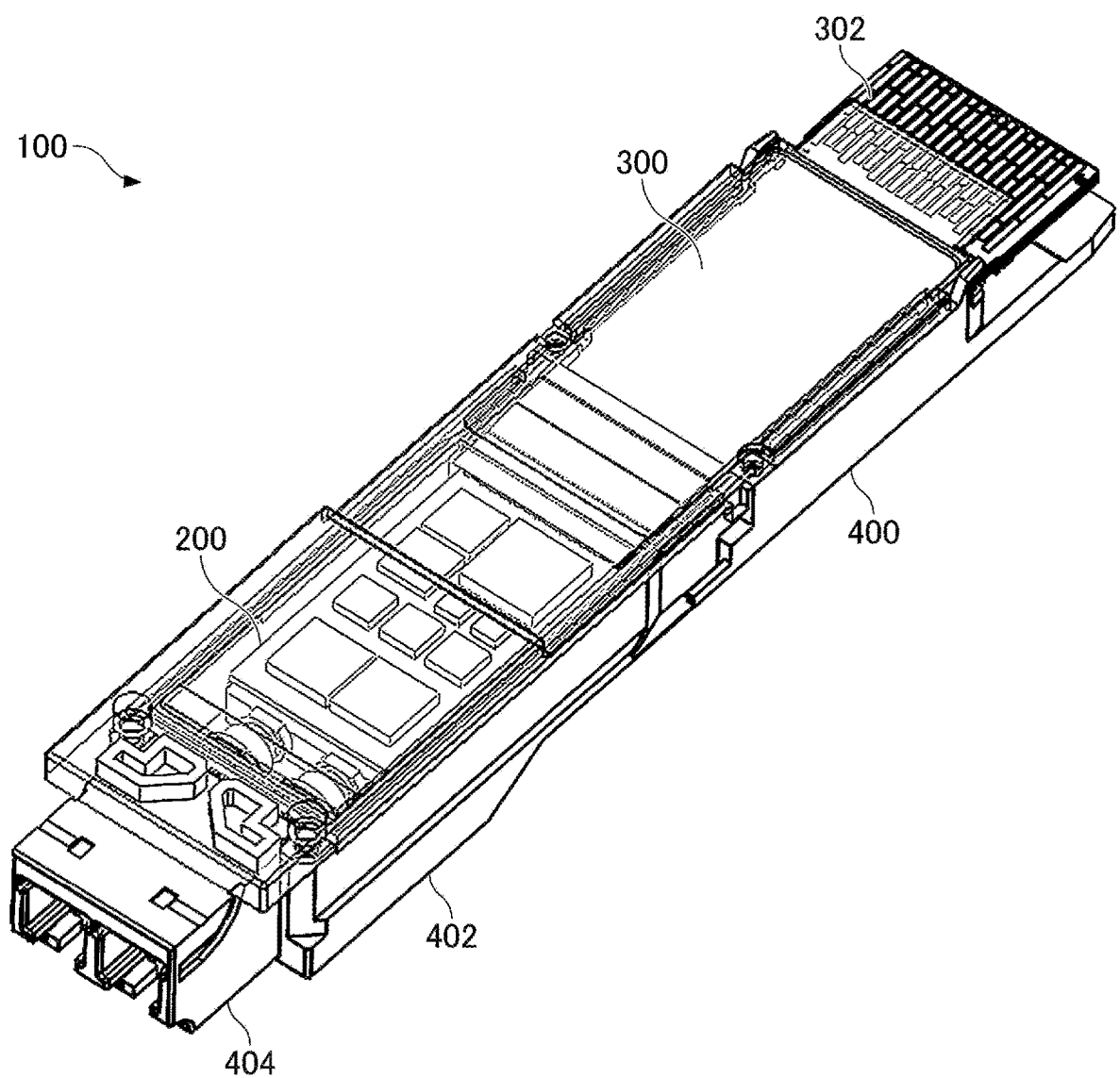
FIG. 1 is a perspective view illustrating an example of a configuration of an optical transceiver including an optical transceiver module according to a first embodiment.

Embodiments described herein provide an optical transceiver module in which a control circuit for controlling a photoelectric conversion circuit can be easily reworked.

Description of Embodiments of the Present Disclosure

First, embodiments of the present disclosure are explained.

[1] According to an aspect of the present disclosure, an optical transceiver module includes a package having a first surface and a second surface and containing a light receiving element, a light emitting element, and an optical modulator configured to modulate light that is output from the light emitting element, a rigid circuit board having a first surface and a second surface and including a control circuit provided on the rigid circuit board, the control circuit being configured to control at least one of the light receiving element, the light emitting element, or the optical modulator, and a flexible circuit board including a plurality of signal wires, wherein the rigid circuit board is connected to the package via the flexible circuit board, with the first surface of the rigid circuit board facing the first surface of the package, and the at least one of the light receiving element, the light emitting element, or the optical modulator is electrically connected to the control circuit via the plurality of signal wires.

According to the optical transceiver module, the control circuit, the light receiving element, the light emitting element, and the optical modulator can be provided in areas that are independent from each other, and therefore, in a case where a problem occurs with the control circuits, rework such as replacement of the control components included in the control circuit can be performed easily. Accordingly, the optical transceiver module in which the control circuit for controlling the photoelectric conversion circuit can be reworked easily can be provided.

[2] In the above-described [1], the flexible circuit board may include a main body portion connected to the rigid circuit board, a first end portion provided on one side of the main body portion, and a second end portion provided on an opposite side from the one side of the main body portion, and the first end portion and the second end portion may be connected to the package. Accordingly, the implementation area of the control circuit implemented on the first surface of the rigid circuit board can be secured as a single area.

[3] In the above-described [2], the package may include a first side surface and a second side surface that cross the first surface of the package, the first end portion may be connected to the first side surface by solder, and the second end portion may be connected to the second side surface by solder. Accordingly, the first end portion and the second end portion are soldered to the first side surface and second side surface, respectively, of the package, so that the rigid circuit board can be rigidly fixed to the package.

[4] In the above-described [2], the optical transceiver module may include a plurality of spacers disposed between the first surface of the rigid circuit board and the first surface of the package, wherein a height of each of the plurality of spacers may be greater than a height of a control component included in the control circuit implemented on the first surface of the rigid circuit board. Accordingly, the control component Implemented on the first surface of the rigid circuit board can be prevented from being short-circuited with the package. Furthermore, the control component implemented on the back surface of the rigid circuit board can be prevented from coming into pressurized contact with the package and being damaged.

[5] In the above-described [4], the main body portion may include an opening portion on an inner side. Accordingly, a spacer can be brought into contact with the package without colliding with the flexible circuit board, and the rigid circuit board can be reliably supported on the package.

[6] In the above-described [5], the plurality of spacers may penetrate through the opening portion. Accordingly, because the plurality of spacers penetrate through the opening portion, the spacers can be brought into contact with the package without colliding with the flexible circuit board.

[7] In the above-described [1], the rigid circuit board and the flexible circuit board may be formed integrally. Accordingly, the area where components can be implemented on the back surface of the circuit board can be made larger than the rigid circuit board, and the efficiency of implementation of the control components can be improved. Furthermore, the degree of flexibility in arrangement and wiring of the control components implemented on the circuit board increases, and therefore, the board design can be facilitated.

[8] According to an aspect of the present disclosure, an optical transceiver in which the optical transceiver module of the above-described [1] may be implemented. According to the optical transceiver, the control circuit, the light receiving element, the light emitting element, and the optical modulator can be provided in areas that are independent from each other, and therefore, in a case where a problem occurs with the control circuits, rework such as replacement of the control components included in the control circuit can be performed easily. Accordingly, the optical transceiver module in which the control circuit for controlling the photoelectric conversion circuit can be reworked easily can be provided.

Embodiment of the Present Disclosure

Specific examples of an optical transceiver module for an optical transceiver and an optical transceiver according to the present disclosure are described below with reference to the drawings. The embodiments are not limited to the following explanations. In the following explanation, signal lines for transmitting information such as signals are denoted with the reference numerals as the reference numerals for denoting signal names. Unless otherwise noted, lines with arrowheads in the drawings indicate transmission paths of signals or information. Also, signal lines represented as single lines in the drawings may have multiple bits.

First Embodiment

[Overall Configuration of Optical Transceiver]

FIG. 1 is a perspective view illustrating an example of a configuration of an optical transceiver including an optical transceiver module according to a first embodiment. For example, an optical transceiver 100 as illustrated in FIG. 1 includes an IC-TROSA 200, a host board 300, and a housing 400 conforming to the QSFP-DD standard in which the IC-TROSA 200 and the host board 300 are accommodated. In FIG. 1, a part of the housing 400 is illustrated as transparent so that the IC-TROSA 200 and the host board 300 can be seen.

The IC-TROSA 200 includes: a photoelectric conversion circuit including an optical modulator, a light receiving element, a tunable laser, and the like; and a control circuit configured to control the photoelectric conversion circuit. The IC-TROSA 200 is an example of an optical transceiver module. The optical transceiver module implemented on the optical transceiver 100 is not limited to the IC-TROSA 200. The host board 300 has a terminal unit 302 connected to a connector of a host apparatus, not illustrated.

On one of the surfaces of the IC-TROSA 200 (i.e., a lower side of FIG. 1), the housing 400 includes a heat dissipation unit 402 for dissipating heat that is generated from the IC-TROSA 200. On the opposite side from the terminal unit 302, the housing 400 includes a socket unit 404 into which optical cables are inserted. An example of the IC-TROSA 200 is explained later with reference to FIG. 3 and subsequent drawings.

Figure 2:
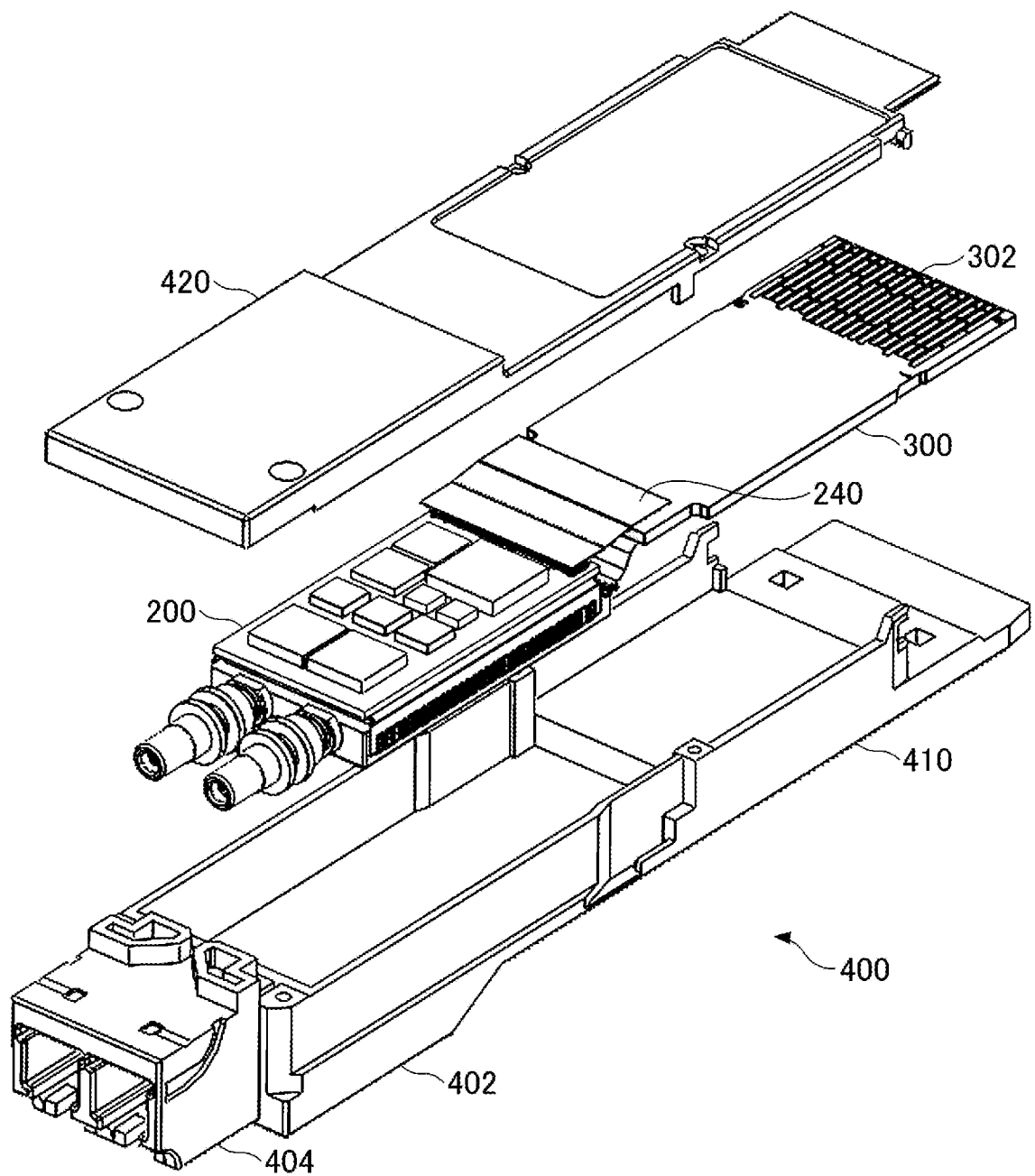
FIG. 2 is an exploded perspective view illustrating the optical transceiver of FIG. 1.

FIG. 2 is an exploded perspective view illustrating the optical transceiver 100 of FIG. 1. The housing 400 includes an upper housing 410 including an accommodation space in which the IC-TROSA 200 and the host board 300 are accommodated; and a lower housing 420. The optical transceiver 100 is connected to a host apparatus, not illustrated, with the heat dissipation unit 402 being on the upper side.

Accordingly, the heat generated from the IC-TROSA 200 can be released to the upper side (to the lower side in FIG. 2) via the heat dissipation unit 402.

[Overall Configuration of Optical Transceiver Module]

Figure 3:
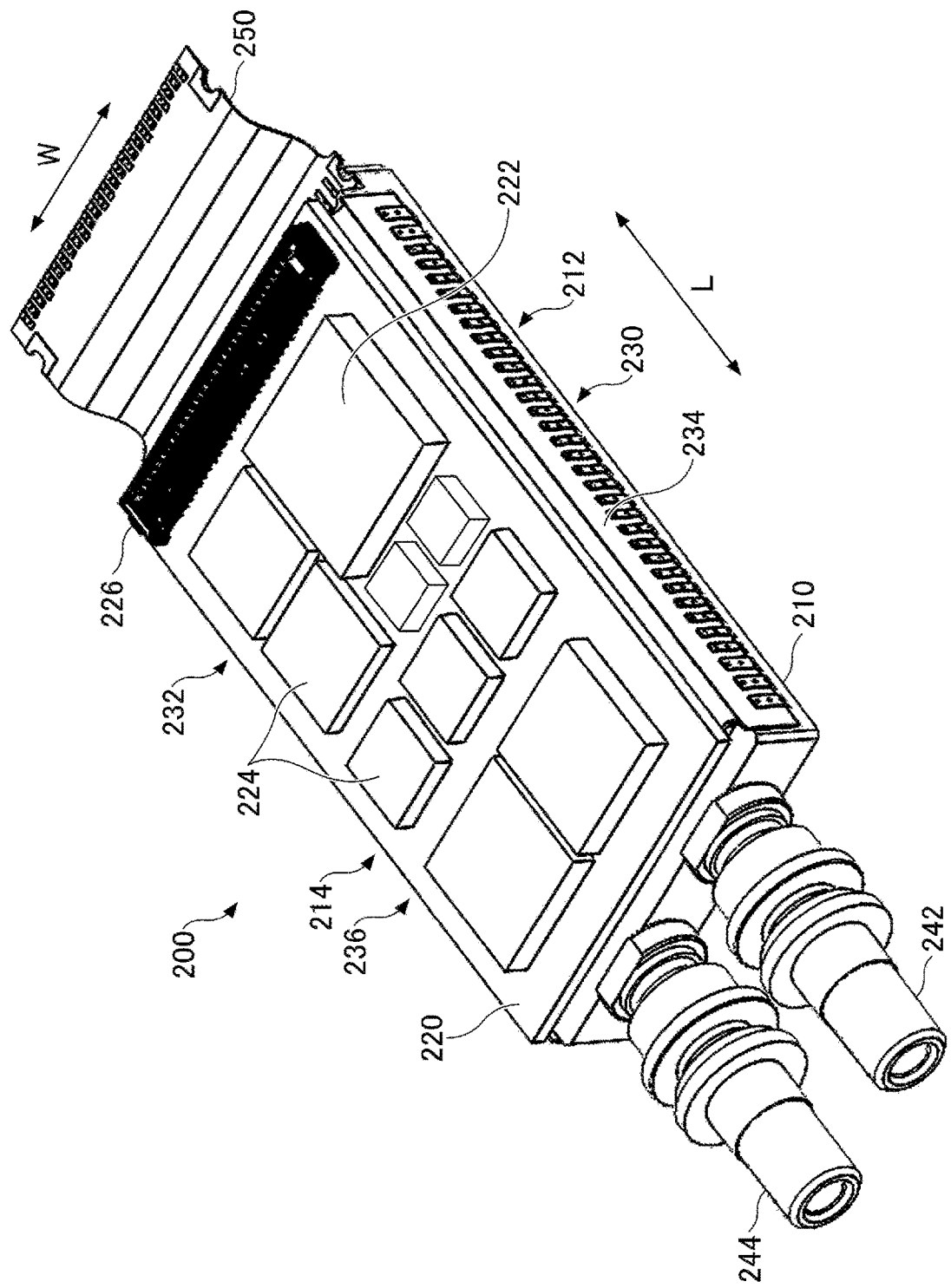
FIG. 3 is a perspective view illustrating an IC-TROSA of FIG. 1.

FIG. 3 is a perspective view illustrating the IC-TROSA 200 of FIG. 1. The IC-TROSA 200 includes: a package 210 in a box shape in which the Photoelectric conversion circuit is included; and a rigid circuit board 220 in a rectangular shape on which a control circuit is implemented. Also, the IC-TROSA 200 includes a flexible circuit board 230 that electrically connects, with each other, the circuit included in the package 210 and the circuit implemented on the rigid circuit board 220. For example, the package 210 including the photoelectric conversion circuit is formed by a ceramic or the like, and the rigid circuit board 220 is formed by a glass epoxy board including multiple wiring layers, although the package 210 and the rigid circuit board 220 are not limited thereto.

Sleeves 242 and 244 are attached to one end of the package 210 in a length direction L. Ferrules of optical cables, not illustrated are inserted into the sleeves 242 and 244. A flexible circuit board 250 is connected to the other end of the package 210 in the length direction L. The flexible circuit board 250 is configured to connect to the host board 300 of FIG. 2. The maximum external dimensions of the IC-TROSA 200 excluding the flexible circuit board 250 and the sleeves 242 and 244 are determined by the MSA. The external dimensions of the IC-TROSA 200 determined by the MSA are a width of up to 15.1 mm (the size in the width direction W), a length of up to 30 mm (the size in the length direction L), and height of up to 6.5 mm.

Radio frequency signals are transmitted and received between the photoelectric conversion circuit implemented in the package 210 and the host board 300. Therefore, the terminals of the package 210 and the terminals of the flexible circuit board 250 are soldered. Also, the terminals of the flexible circuit board 250 and the terminals of the host board 30C, not illustrated, are soldered.

Control components such as a microcomputer 222 and the like for monitoring the operation state of the photoelectric conversion circuit in the package 210 and controlling the photoelectric conversion circuit, other control components 224, and a connector 226 are implemented on the rigid circuit board 220. The microcomputer 222 implemented on the rigid circuit board 220 is an example of a control circuit.

The connector 226 is attached to the other end of the rigid circuit board 220 in the length direction L. The other end of the flexible circuit board 240 (illustrated in FIG. 2), one end of which is connected to the host board 300, is connected to the connector 226 in such a manner that the flexible circuit board 240 can be inserted into and removed from the connector 226. Various kinds of control components are implemented on not only the front surface (upper side of FIG. 3) but also the back surface of the rigid circuit board 220.

Multiple terminals (not illustrated) of the rigid circuit board 220 are connected to multiple terminals (not illustrated) provided on the main body portion 232 of the flexible circuit board 230 facing the back surface side of the rigid circuit board 220. The connection between the rigid circuit board 220 and the flexible circuit board 230 is explained with reference to FIG. 4 and FIG. 7.

The flexible circuit board 230 includes the main body portion 232 that faces the back surface of the rigid circuit board 220 and has a shape corresponding to the rectangular shape of the rigid circuit board 220 and the rectangular shape of the front surface (the upper surface of FIG. 3) of the package 210. Also, the flexible circuit board 230 includes a pair of protruding portions 234 and 236 that protrude to the opposite side from the front surface of the flexible circuit board 230.

The protruding portions 234 and 236 are provided on a pair of sides along the length direction L on both sides of the main body portion 232 in the width direction W. The protruding portions 234 and 236 are examples of a first end portion and a second end portion, respectively. The protruding portions 234 and 236 include multiple terminals arranged in the length direction L. The terminals of the protruding portions 234 and 236 are soldered to the terminals provided on side surfaces 212 and 214 that are on both sides of the package 210 in the width direction W and that cross (e.g., substantially perpendicular to) the front surface of the package 210. The flexible circuit board 230 includes multiple signal wires that connect multiple terminals of the main body portion 232 and multiple terminals of the protruding portions 234 and 236. The side surfaces 212 and 214 are examples of a first side surface and a second side surface, respectively.

The flexible circuit board 230 is soldered to the rigid circuit board 220 and is also soldered to the package 210. Accordingly, the rigid circuit board 220 is fixed to the package 210, with the back surface (one surface) of the rigid circuit board 220 and the front surface (one surface) of the package 210 being arranged opposite to each other. The photoelectric conversion circuit included in the package 210 is electrically connected via multiple signal wires to the control circuit implemented on the rigid circuit board 220.

As illustrated in FIG. 3, the control component included in the control circuit implemented on the rigid circuit board 220 is exposed to the outside of the package 210. The control components and the photoelectric conversion components are provided in areas that are independent from each other, so that rework such as replacement of the control components can be performed easily in a case where a problem occurs with control components (the control circuit). The control components are provided outside of the package 210, so that noise generated by operations of the control circuit implemented on the control component can be alleviated from affecting the photoelectric conversion circuit in the package 210.

The external dimensions of the rigid circuit board 220 may be approximately the same as the external dimensions of the package 210. For example, the external dimensions of the rigid circuit board 220 may be the maximum width (15.1 mm) and the maximum length (30 mm) of the IC-TROSA defined by the MSA. Therefore, the degree of flexibility in arrangement of the control component and the degree of flexibility in wires formed on the rigid circuit board 220 can be improved, which can facilitate the implementation design (the wire layout).

The rigid circuit board 220 of which the external dimensions are large can be used, and therefore, general-purpose control components can be used, and the cost of the IC-TROSA 200 can be reduced, so that the development period can be shortened. Furthermore, it is not necessary to provide control components in the package 210, and therefore, the degree of flexibility in the layout of the photoelectric conversion components and the optical components can be improved, which can facilitate the implementation design.

In contrast, in a case where control components (control circuits) are implemented in the package of the IC-TROSA, for example, it is desired to integrate multiple control components into an application specific integrated circuit (ASIC) and the like to be made into a single chip. In this case, the cost of the IC-TROSA greatly increases. Normally, the package on which the photoelectric conversion circuit is implemented is hermetically sealed, and therefore, in a case where a problem is found with the circuit implemented in the package, it is difficult to rework components including the circuit in which a problem is found. For this reason, in a case where a problem is found with the circuit implemented in the package, it is necessary to discard the package.

Furthermore, in a case where the rigid circuit board on which the control component is implemented is accommodated in the package of the IC-TROSA, the size of the rigid circuit board is smaller than the rigid circuit board 220. Therefore, the efficiency of implementation of the control components decreases. Furthermore, it is difficult to arrange and solder wires for connecting the rigid circuit board accommodated in the package of the IC-TROSA and the photoelectric conversion components in the package.

Figure 4:
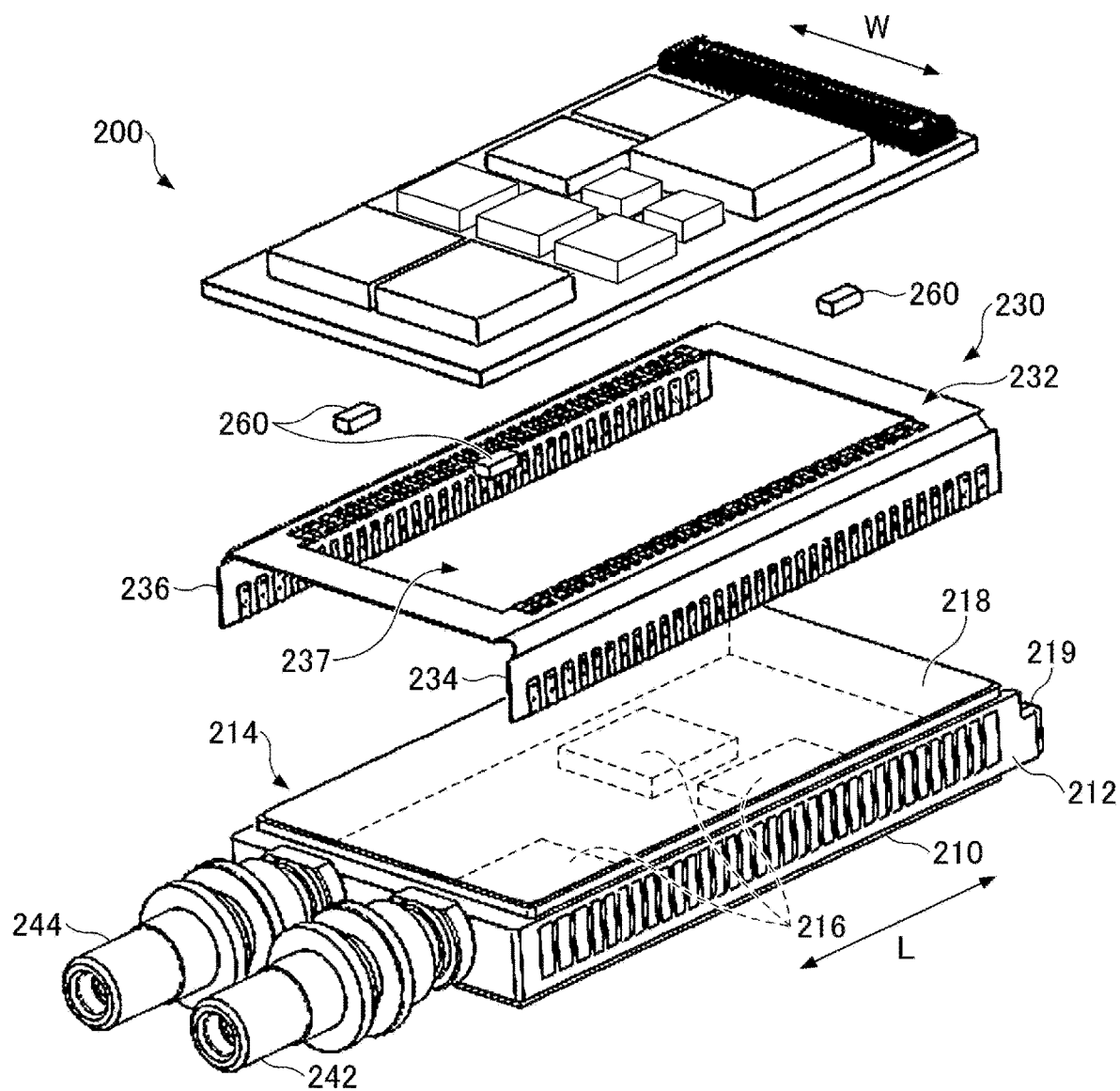
FIG. 4 is an exploded perspective view of FIG. 3.

FIG. 4 is an exploded perspective view of FIG. 3. The flexible circuit board 230 includes multiple terminals arranged along the length direction L on both sides of the width direction W of the main body portion 232 such that the multiple terminals are arranged to face the back surface (one surface) of the rigid circuit board 220. The multiple terminals of the main body portion 232 of the flexible circuit board 230 are soldered to the terminals provided on the back surface of the rigid circuit board 220. As explained with reference to FIG. 7, in the actual implementation, the flexible circuit board 230 is soldered to the rigid circuit board 220, and thereafter, unnecessary portions are cut off.

The length in the length direction L is larger than the length in the width direction W in the rigid circuit board 220, the main body portion 232 of the flexible circuit board 230, and the package 210. Accordingly, the soldering terminals for connecting the rigid circuit board 220 and the flexible circuit board 230 are formed along the length direction L, so that, as compared with the case where the terminals are formed in the width direction W, more terminals can be formed.

Therefore, in a case where the same number of terminals are formed in the length direction L and the width direction W, the size of the terminals formed along the length direction L can be increased and can be soldered more reliably. Furthermore, the terminal intervals can be increased, and therefore, solder bridging between neighboring terminals can be provided.

Figure 7:
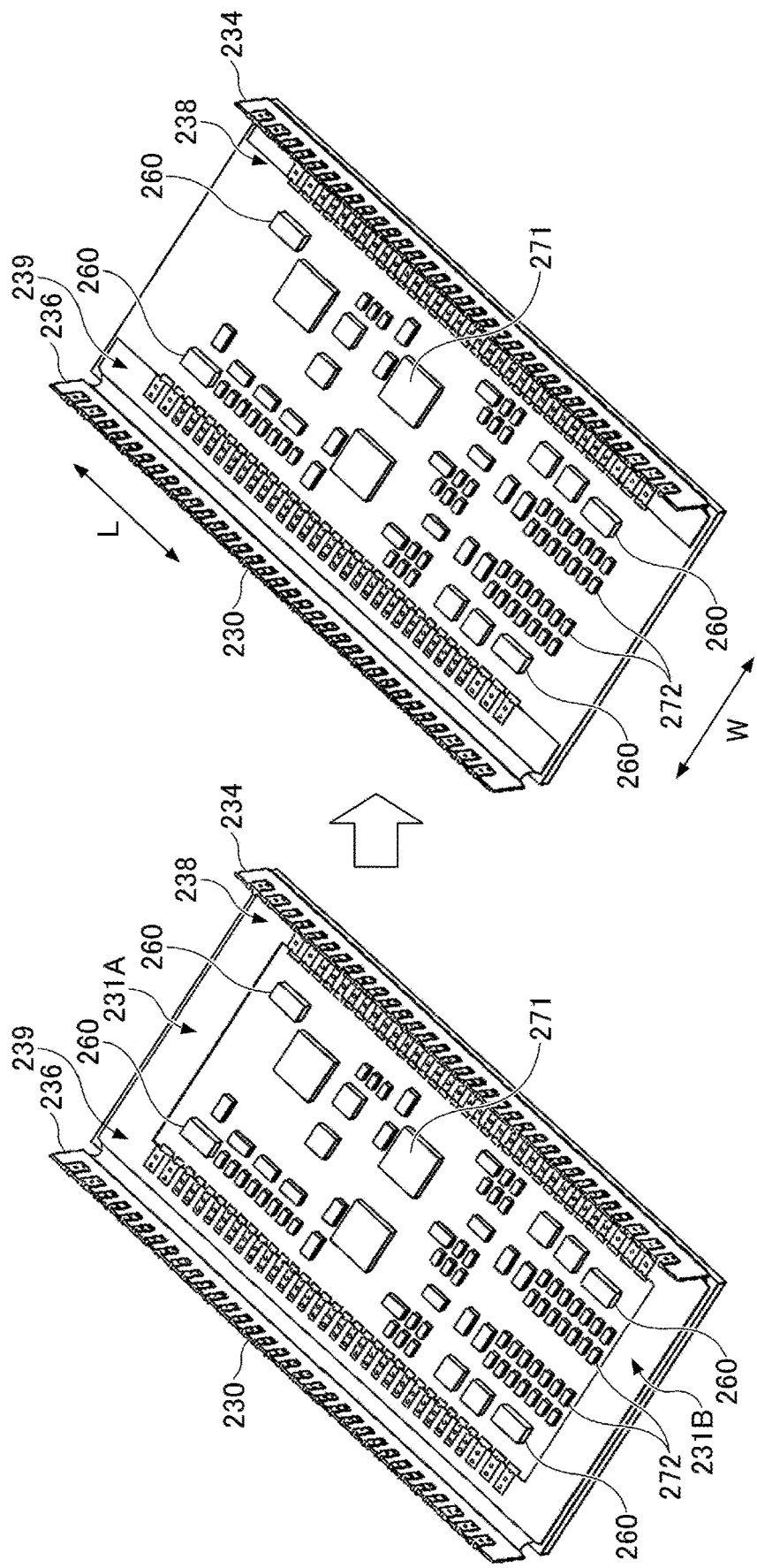
FIG. 7 is an explanatory diagram illustrating a step of cutting unnecessary portions of a flexible circuit board after a rigid board is soldered to the flexible board.

Furthermore, the soldering terminals are formed along the length direction L on both sides in the width direction W, so that, as illustrated in FIG. 7, the implementation area for the control components on the back surface of the rigid circuit board 220 can be secured as a single area. Furthermore, the protruding portions 234 and 236 of the flexible circuit board 230 are formed in the length direction L in which the length is longer than in the width direction W, so that the rigid circuit board 220 can be fixed reliably and rigidly on the package 210.

Multiple circuit components 216 such as an optical modulator, a light receiving element, a tunable laser, and the like, and optical components are implemented in the package 210. The respective circuit components 216 are connected to the terminals provided in the terminal unit 219 on the rear side of the package 210, and are connected to the terminals of the flexible circuit board 250 as illustrated in FIG. 3. After the circuit components 216 are implemented, the package 210 is hermetically sealed by placing a lid 218 in a plate shape.

Spacers 260 are fixed to locations in proximity to the four corners on the back surface of the rigid circuit board 220. In the example as illustrated in FIG. 4, the spacers 260 have a rectangular parallelepiped shape, but are not limited to the rectangular parallelepiped shape. The spacers 260 may have a cylindrical shape or the like. One end of the spacer 260 (a side of the spacer 260 on the opposite side from the rigid circuit board 220) is in contact with one surface of the package 210 (i.e., the lid 218). Note that although the spacers 260 are preferably fixed to the four locations on the periphery of the rigid circuit board 220, the positions and the number of spacers 260 are not limited the example illustrated in FIG. 4.

The rigid circuit board 220 is supported on the package 210 via the spacers 260, so that the control components implemented on the back surface of the rigid circuit board 220 can be prevented from coming into contact with the package 210. Accordingly, the control components implemented on the back surface of the rigid circuit board 220 can be prevented from being short-circuited with the package 210. Furthermore, the control components implemented on the back surface of the rigid circuit board 220 can be prevented from coming into pressurized contact with the package 210 (the lid 218) and being damaged.

The base film and the signal wires of the flexible circuit board 230 are not provided at the positions corresponding to the spacers 260. Specifically, an opening portion 237, through which the spacers 260 penetrate, are provided on the inner side (i.e., a central portion) of the main body portion 232 of the flexible circuit board 230. Therefore, the spacers 260 can be brought into contact with the package 210 without colliding with the flexible circuit board 230, and the rigid circuit board 220 can be reliably supported on the package 210.

Also, as illustrated in FIG. 3, the back surface (one surface) of the rigid circuit board 220 is fixed to the package 210 in such a state that the back surface is arranged to face the upper surface (one surface) of the package 210 via the flexible circuit board 230. Accordingly, components such as a light emitting element, an optical modulator, a light receiving element, and the like implemented in the package 210 are electrically connected to the circuit of the rigid circuit board 220 via multiple signal wires provided on the flexible circuit board 230.

As illustrated in FIG. 4, with the IC-TROSA 200 according to this embodiment, both of the rigid circuit board 220 on which the control circuit is implemented and the package 210 in which the photoelectric conversion circuit is implemented can be produced, and each of them can be inspected individually. The rigid circuit board 220 and the package 210, which are inspected individually, are assembled via the flexible circuit board 230, and the IC-TROSA 200 is manufactured, so that the defect rate in the final inspection after assembly can be reduced. As a result, for example, rework due to defect of the control circuit that is found after assembly can be reduced. Note that the control components included in the control circuit are implemented on the rigid circuit board 220, and therefore, the rework can be facilitated.

[Circuit Configuration of Optical Transceiver Module]

Figure 5:
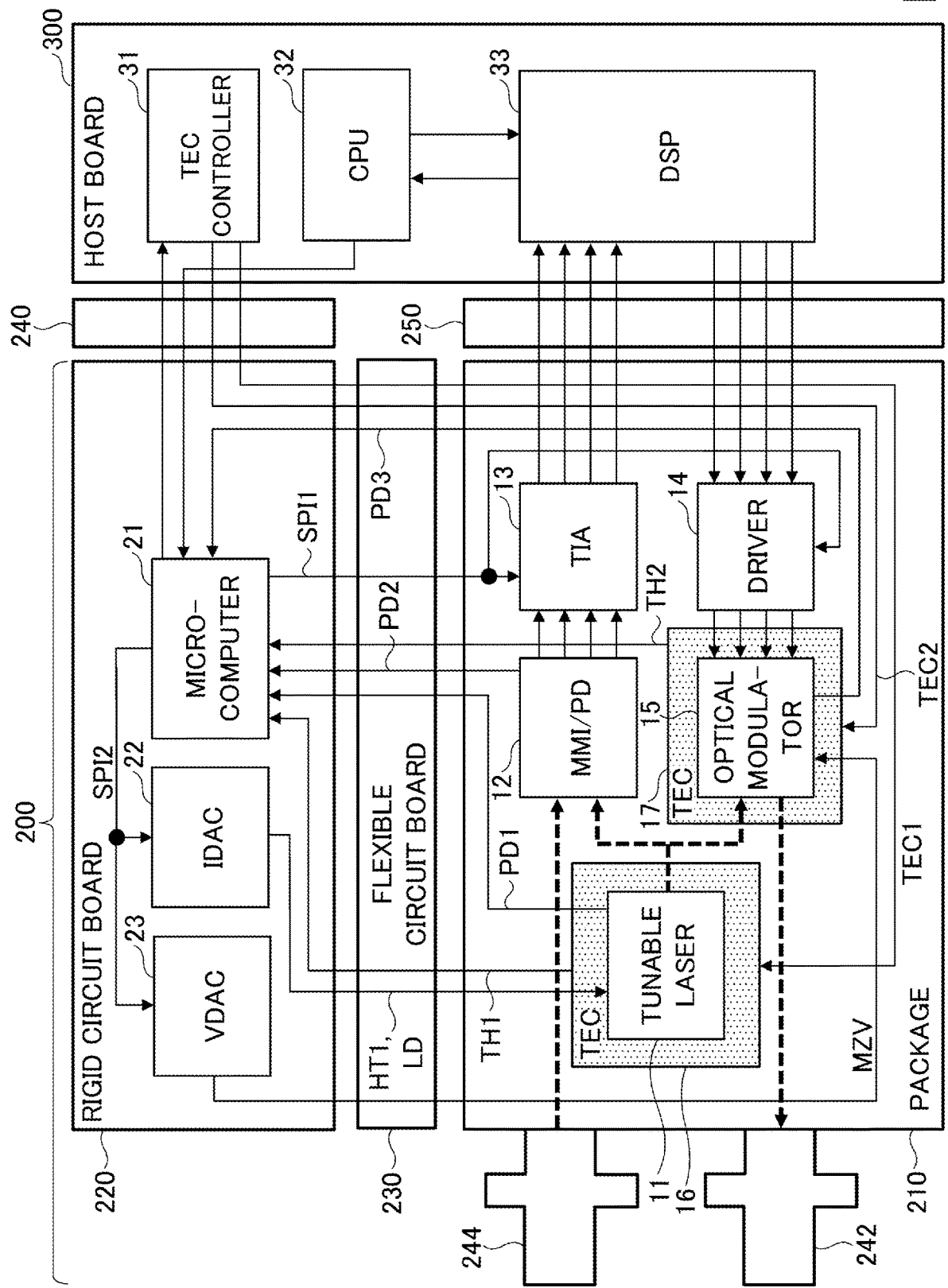
FIG. 5 is a functional block diagram illustrating a circuit configuration of IC-TROSA of FIG. 3.

FIG. 5 is a functional block diagram illustrating a circuit configuration of the IC-TROSA 200 of FIG. 3. In FIG. 5, arrows of thick broken lines represent transmission paths of optical signals. In FIG. 5, arrows of solid lines represent electric signals (control signals). A single control signal in FIG. 5 may include multiple control signals in the actual implementation.

A tunable laser 11, a MMI/PD module 12 in which a multi-mode interference (MMI) element and a photodiode PD are integrated, a transimpedance amplifier (TIA) 13, a driver 14, and an optical modulator 15 are included in the package 210 of the IC-TROSA 200. A thermo-electric cooler (TEC) 16 for cooling the tunable laser 11 and a TEC 17 for cooling the optical modulator 15 are included in the package 210.

The rigid circuit board 220 includes components such as a microcomputer 21, an electric current output DAC 22, and a voltage output DAC 23. Hereinafter, the electric current output DAC 22 is also referred to as an IDAC 22, and the voltage output DAC 23 is also referred to as a VDAC 23. The microcomputer 21 corresponds to the microcomputer 222 of FIG. 3. The microcomputer 21, the IDAC 22, and the VDAC 23 are an example of a control circuit for controlling the photoelectric conversion circuit included in the package 210. The host board 300 includes a TEC controller 31, a central processing unit (CPU) 32, and a digital signal processor (DSP) 33.

The microcomputer 21 operates according to a control signal received from the CPU 32 of the host board 300. The microcomputer 21 receives a temperature monitor signal TH1 indicating the temperature of the TEC 16 from the TEC 16, and outputs the received temperature monitor signal TH1 to the TEC controller 31 via the flexible circuit board 240. The microcomputer 21 receives the temperature monitor signal TH2 indicating the temperature of the TEC 17 from the TEC 17, and outputs the received temperature monitor signal TH2 to the TEC controller 31. Alternatively, the temperature monitor signals TH1 and TH2 transmitted to the rigid circuit board 220 may be directly provided to the TEC controller 31 without the intervention of the microcomputer 21.

The microcomputer 21 receives from the tunable laser 11 a miscellaneous monitor signal PD1 such as a power monitor signal, a wavelength monitor signal, and the like indicating the state of the tunable laser 11. The microcomputer 21 receives a miscellaneous monitor signal PD2 indicating the state of the MMI/PD module 12 from the MMI/PD module 12. The microcomputer 21 receives a miscellaneous monitor signal PD3 indicating the state of the optical modulator 15 from the optical modulator 15.

The microcomputer 21 outputs a control signal for controlling the TIA 13 and the drive 14 via a signal line SPI1 corresponding to the serial peripheral interface (SPI). Also, the microcomputer 21 outputs a control signal for controlling the IDAC 22 and the VDAC 23 via a signal line SPI2 corresponding to an SPI interface.

The IDAC 22 outputs, to the tunable laser 11, an electric current LD for oscillating the tunable laser 11 and a control signal l for controlling the wavelength of the tunable laser 11, according to the control signal from the microcomputer 21. The VDAC 23 outputs a Mach-Zehnder bias MZV for controlling the optical modulator 15 to the optical modulator 15, according to the control signal from the microcomputer 21.

The tunable laser 11 generates an optical signal of a predetermined wavelength according to the control signal HT1 received from the IDAC 22, and outputs an optical signal, split by a beam splitter, not illustrated, to the MMI/PD module 12 and the optical modulator 15. The tunable laser 11 is an example of a light emitting element. For example, the light emitting element may be a semiconductor laser such as DFB laser and EML (Electro-absorption Modulator integrated with DFB Laser).

For example, with a 90-degree hybrid coupler by the MMI element, the MMI/PD module 12 separates, with respect to the polarization, a phase-modulated and polarization-multiplexed optical signal received from an optical cable connected to the sleeve 244. After the optical signal separated with respect to the polarization is superimposed with the optical signal from the tunable laser 11 to cause interference, the MMI/PD module 12 detects, with the photodiode PD, an in-phase component I and a quadrature component Q of an X polarization and an in-phase component I and a quadrature component Q of a Y polarization. The photodiode PD converts the in-phase component I and the quadrature component Q of the X polarization and the in-phase component I and the quadrature component Q of the Y polarization, which have been detected, into respective electric current signals, and outputs the converted electric current signals to the TIA 13. The photodiode PD is an example of a light receiving element. For example, the light receiving element may be a photodetector that does not include a diode structure.

The TIA 13 operates according to the control signal from the microcomputer 21. The TIA 13 generates respective voltage signals by amplifying the electric current signal of the in-phase component I and the electric current signal of the quadrature component Q of each of the X polarization and the Y polarization received from the photodiode PD of the MMI/PD module 12. The TIA 13 outputs the generated voltage signal to the DSP 33.

The driver 14 operates according to the control signal from the microcomputer 21, and drives the optical modulator 15 according to the signal of the in-phase component I and the signal of the quadrature component Q of each of the X polarization and the Y polarization received from the DSP 33.

The optical modulator 15 is, for example, a Mach-Zehnder-type modulator, and operates by receiving the Mach-Zehnder bias MZV for the in-phase component I and the quadrature component Q of each of the X polarization and the Y polarization from the VDAC 23. The optical modulator 15 generates a phase-modulated and polarization-multiplexed optical signal by combining the signal of the in-phase component I and the signal of the quadrature component Q with respect to the polarization by using the optical signal that is output from the tunable laser 11. The generated optical signal is output to the optical cable connected to the sleeve 242.

The TEC controller 31 outputs to the TEC 16 a control signal TEC1 for controlling the TEC 16 according to the temperature monitor signal TH1 received via the microcomputer 21. The TEC controller 31 outputs to the TEC 17 a control signal TEC2 for controlling the TEC 17 according to the temperature monitor signal TH2 received via the microcomputer 21. The CPU 32 controls the IC-TROSA 200, and controls the DSP 33.

The DSP 33 receives the voltage signal of the in-phase component I and the quadrature component Q of the X polarization and the voltage signal of the in-phase component I and the quadrature component Q of the Y polarization from the TIA 13 via the flexible circuit board 250. The DSP 33 generates parallel high-speed reception data signals (digital signals), and outputs the generated high-speed reception data signal to a host apparatus, not illustrated, according to the received voltage signal.

Also, the DSP 33 receives parallel high-speed transmission data signals (digital signals) from the host apparatus. The DSP 33 converts the received parallel high-speed transmission data signals into signals of the in-phase component I and the quadrature component Q of the X polarization and signals of the in-phase component I and the quadrature component Q of the Y polarization. The DSP 33 outputs the converted signals of the in-phase component I and the converted signals of the quadrature component Q of the X polarization and the Y polarization to the driver 14.

[Configuration of Package of Optical Transceiver Module]

Figure 6:
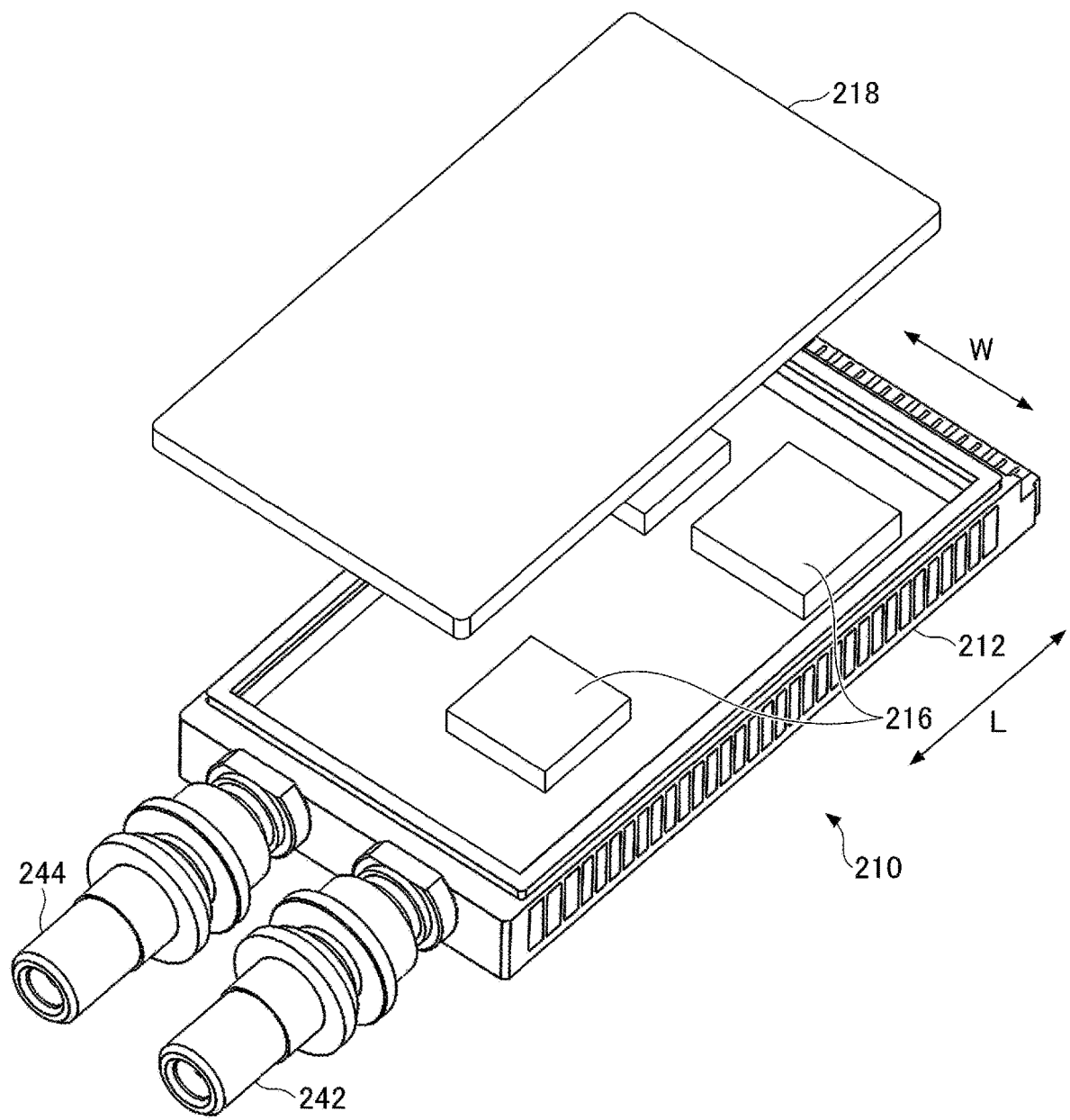
FIG. 6 is an exploded perspective view before an IC-TROSA package is hermetically sealed.

FIG. 6 is an exploded perspective view before the package 210 of the IC-TROSA 200 is hermetically sealed. Multiple circuit components 216 such as the tunable laser 11, the MMI/PD module 12, the TIA 13, the driver 14, the optical modulator 15, the TECs 16 and 17, and the like as illustrated in FIG. 5 are implemented in the accommodation space provided in the package 210.

After the circuit components 216 are implemented in the package 210, the lid 218 is placed on the opening portion of the package 210, and the package 210 is hermetically sealed. It is difficult to detach the lid 218 from the package 210 without damaging the hermetically sealed package 210. Therefore, it is difficult to rework the circuit component 216 of the package 210 that is once hermetically sealed.

[Connection Between Rigid Circuit Board and Flexible Circuit Board]

FIG. 7 is an explanatory diagram illustrating an example of cutting off unnecessary portions of the flexible circuit board 230 after the flexible circuit board 230 is soldered to the rigid circuit board 220. The unnecessary portions of the main body portion 232 of the flexible circuit board 230 may be cut off and removed.

For example, various kinds of control components 271 and 272, the spacers 260, and the terminals of the flexible circuit board 230 are soldered to the back surface of the rigid circuit board 220. As a result, a state as illustrated on the left side of FIG. 7 is obtained. Note that the flexible circuit board 230 and the various kinds of control components 271 and 272 may be soldered to the rigid circuit board 220 at a same time, or the flexible circuit board 230 and the various kinds of control components 271 and 272 may be soldered to the rigid circuit board 220 at different times.

Thereafter, unnecessary portions of the flexible circuit board 230 that are located on either side of the rigid circuit board 220 in the length direction L are cut off. The unnecessary portions that are cut off are areas 231A and 231B that do not include the terminals soldered to the terminals of the rigid circuit board 220 and that extend in the width direction W. The areas 231A and 231B are cut off and removed, so that the main body portion 232 is separated by terminal areas 238 and 239 including the terminals soldered to the terminals of the rigid circuit board 220.

After the flexible circuit board 230 including the connected protruding portions 234 and 236 is soldered to the rigid circuit board 220, the unnecessary portions of the flexible circuit board 230 are cut off, so that the accuracy in the position of the terminals of the protruding portions 234 and 236 are prevented from decreasing. In this case, the accuracy in the position of the terminals includes the shift in position in the length direction L and the shift in the interval between the protruding portions 234 and 236 in the width direction W. In contrast, in a case where two respective flexible circuit boards that include the protruding portions 234 and 236 are soldered to the rigid circuit board 220, the accuracy in the position of the terminals of the protruding portions 234 and 236 may decrease.

[Arrangement of Spacers with Respect to the Rigid Circuit Board]

Figure 8:
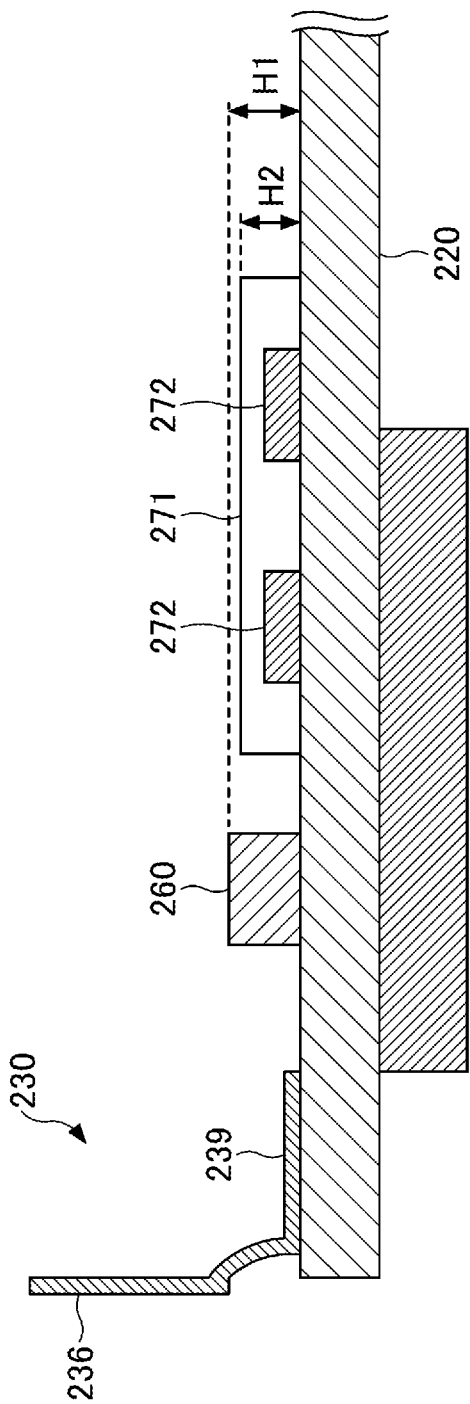
FIG. 8 is a partial cross-sectional view illustrating an example of a rigid board on which control components and a spacer are mounted.

FIG. 8 is a partial cross-sectional view illustrating an example of the rigid circuit board 220 on which the control components 271 and 272 and the spacer 260 are implemented. For example, the spacers 260 are designed so that a height H1 of the spacers 260 soldered to the rigid circuit board 220 is greater than any of the heights of all the control components implemented on the back surface of the rigid circuit board 220 (the upper side of FIG. 8).

In the example of FIG. 8, the height H1 of the spacer 260 is greater than a height H2 of the control component 271 that is the tallest among the control components implemented on the back surface of the rigid circuit board 220. Accordingly, the control components implemented on the back surface of the rigid circuit board 220 can be prevented from being short-circuited with the package 210. Furthermore, the control components implemented on the back surface of the rigid circuit board 220 can be prevented from coming into pressurized contact with the package 210 and being damaged.

As described above, in this embodiment, the control circuit for controlling the photoelectric conversion circuit is implemented on the rigid circuit board 220 provided outside of the package 210, so that in a case where a problem occurs with the control circuits, rework such as replacement of the control components implemented on the control circuit can be performed easily. Therefore, the optical transceiver module 200 and the optical transceiver 100 in which the control circuit for controlling the photoelectric conversion circuit can be easily reworked can be provided. Furthermore, the control components are provided outside of the package 210, so that noise generated by operations of the control circuit implemented on the control component can be alleviated from affecting the photoelectric conversion circuit in the package 210.

As the rigid circuit board 220 is provided outside of the package 210, the size of the rigid circuit board 220 can be increased. As a result, the degree of flexibility in arrangement of the control components in which the control circuit is Implemented and the degree of flexibility in wires formed on the rigid circuit board 220 can be improved, which can facilitate the implementation design (the wire layout). Because general-purpose control components can be used, the cost of the IC-TROSA 200 can be reduced, so that the development period can be shortened.

In the rigid circuit board 220 and the flexible circuit board 230, the soldering terminals are formed in the length direction L on both sides in the width direction W, so that the rigid circuit board 220 can be fixed reliably and rigidly on the package 210.

The rigid circuit board 220 is supported on the package 210 via the spacers 260, so that the control components implemented on the back surface of the rigid circuit board 220 can be prevented from coming into contact with the package 210. Accordingly, the control components implemented on the back surface of the rigid circuit board 220 can be prevented from being short-circuited with the package 210, and can be prevented from coming into contact with the package 210 and being damaged. The opening portion 237 is provided in the flexible circuit board 230, so that the spacers 260 can be brought into contact with the package 210 without colliding with the flexible circuit board 230, and the rigid circuit board 220 can be reliably supported on the package 210.

Second Embodiment

[Configuration Example with Flex-Rigid Circuit Board]

Figure 9:
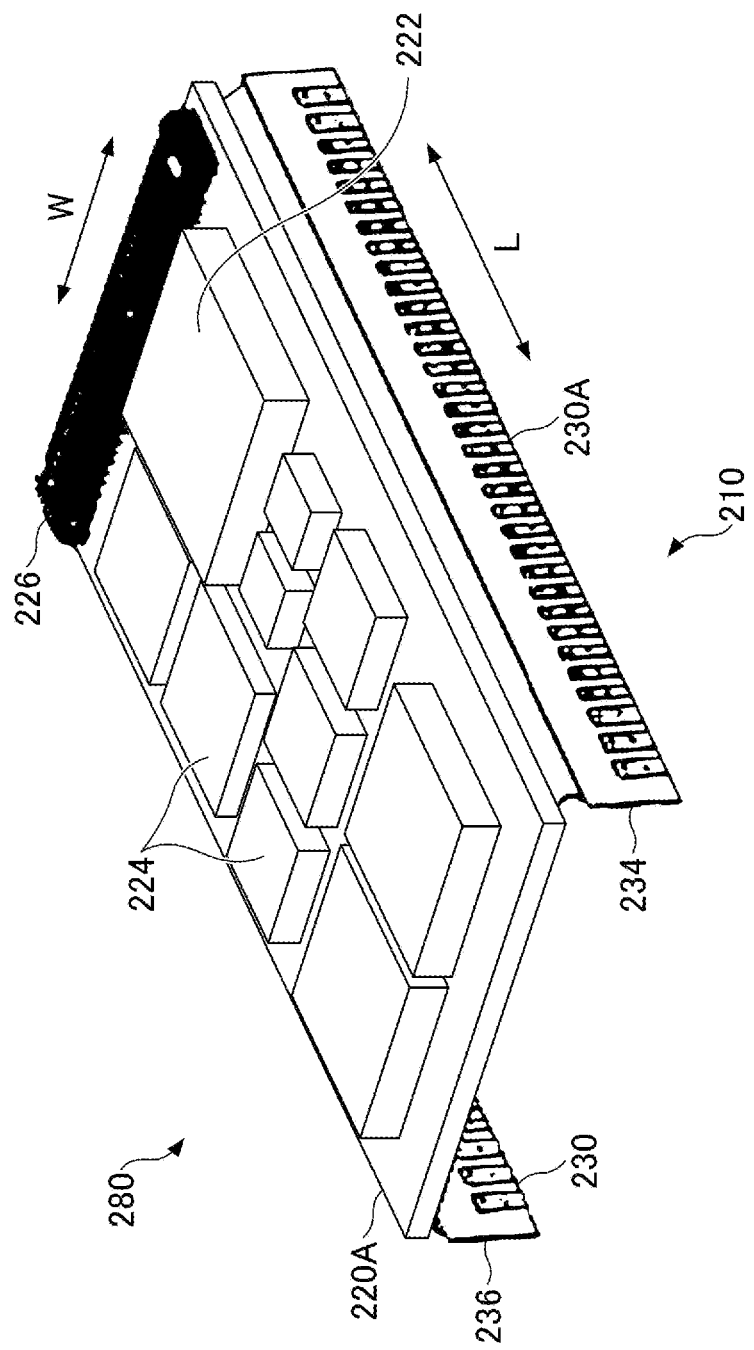
FIG. 9 is a perspective view illustrating an example of a flex-rigid circuit board of an optical transceiver module according to a second embodiment.

FIG. 9 is a perspective view illustrating an example of a flex-rigid circuit board in an optical transceiver module according to a second embodiment. Substantially the same elements as those in the above-described first embodiment are denoted with the same reference numerals.

In the second embodiment, instead of the rigid circuit board 220 and the flexible circuit board 230 as illustrated in FIG. 4, the optical transceiver module is formed by using the flex-rigid circuit board 280 as illustrated in FIG. 9. The flex-rigid circuit board 280 is a hybrid circuit board in which the flexible circuit board is formed in one of multi-level wiring layers of the rigid circuit board. Specifically, the flex-rigid circuit board 280 is achieved by integrally forming the rigid circuit board 220 and the flexible circuit board 230 of FIG. 4.

The configuration of the optical transceiver module except for the flex-rigid circuit board 280 is substantially the same as in FIG. 1 to FIG. 6. Specifically, the optical transceiver module using the flex-rigid circuit board 280 is substantially the same as in FIG. 3 to FIG. 6, and the optical transceiver including the optical transceiver module using the flex-rigid circuit board 280 is substantially the same as in FIG. 1 and FIG. 2.

The flex-rigid circuit board 280 includes a rigid circuit board unit 220A and a flexible circuit board unit 230A. The sizes of the rigid circuit board unit 220A in the length direction L and the width direction W are substantially the same as the size of the rigid circuit board 220 as illustrated in FIG. 3. The control components (222, 224, and the like) and the connector 226 implemented on the rigid circuit board unit 220A are the same as in FIG. 3.

Like the flexible circuit board 230 as illustrated in FIG. 3 and FIG. 4, the flexible circuit board unit 230A includes a pair of protruding portions 234 and 236. Like FIG. 3, the terminals provided on the protruding portions 234 and 236 are soldered to the terminals provided on both side surfaces 212 and 214 of the package 210, not illustrated.

Figure 10:
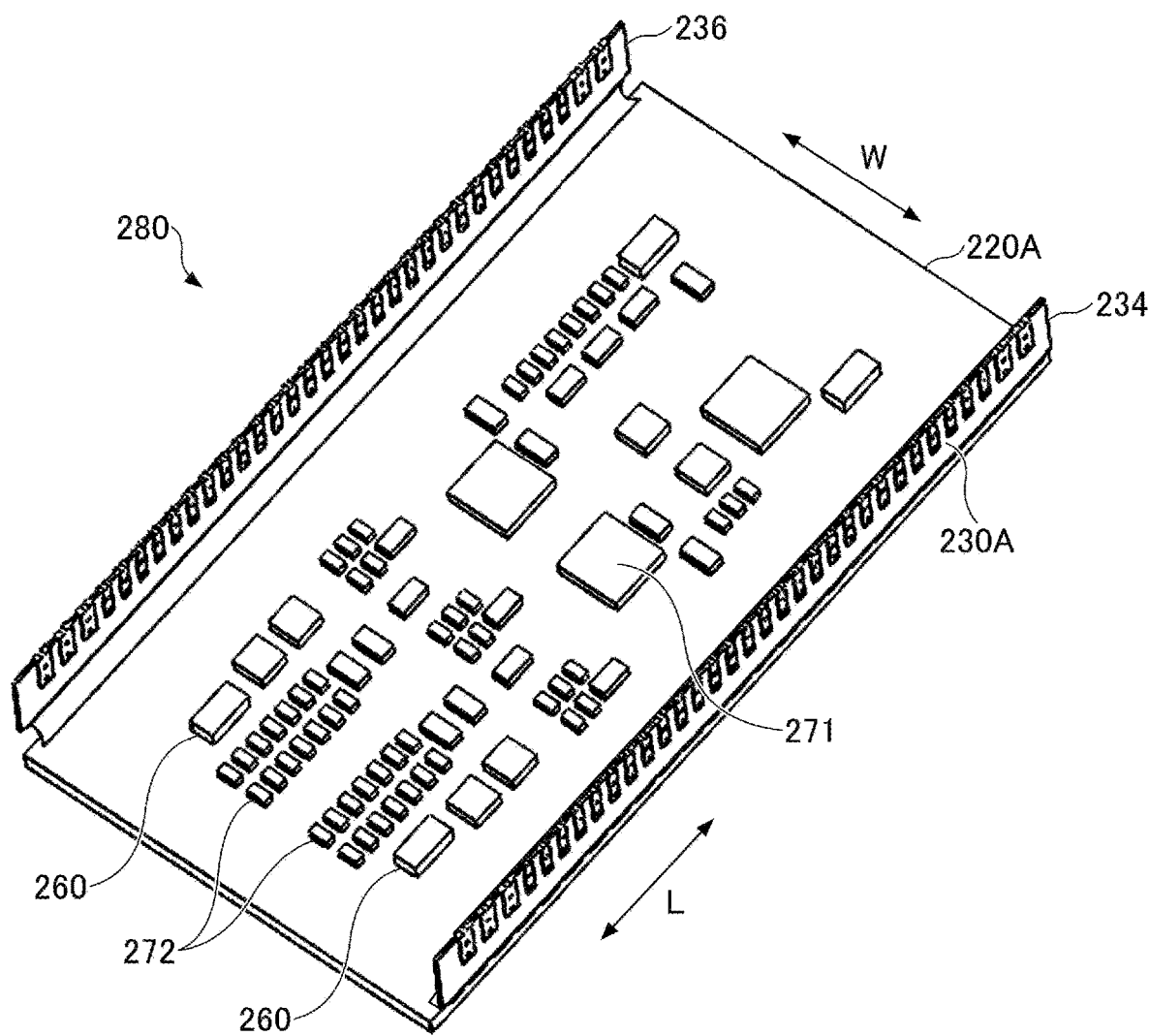
FIG. 10 is a perspective view illustrating the flex-rigid circuit board of FIG. 9 as seen from the back surface.

FIG. 10 is a perspective view illustrating the flex-rigid circuit board 280 of FIG. 9 as seen from the back surface. As can be understood by comparing FIG. 10 and FIG. 7, in the flex-rigid circuit board 280, the soldering terminals that electrically and mechanically connect the rigid circuit board unit 220A and the flexible circuit board unit 230A can be made unnecessary. Accordingly, in the flex-rigid circuit board 280, the area where components can be implemented on the back surface of the circuit board can be made larger than in FIG. 7, and the efficiency of implementation of the control components onto the flex-rigid circuit board 280 can be improved. Furthermore, the degree of flexibility in arrangement and wiring of control components implemented on the flex-rigid circuit board 280 increases, and therefore, the board design can be facilitated.

As described above, in this embodiment, substantially the same effects as in the above-described first embodiment can be obtained. For example, an optical transceiver module for an optical transceiver and an optical transceiver in which the control circuit for controlling the photoelectric conversion circuit can be reworked easily can be provided. Furthermore, in the second embodiment, the efficiency of implementation of the control components to the flex-rigid circuit board 280 can be improved, as compared with the efficiency of implementation of the control components to the rigid circuit board 220 of FIG. 7. Furthermore, the degree of flexibility in arrangement and wiring of the control components implemented on the flex-rigid circuit board 280 increases, and therefore, the board design can be facilitated.

According to embodiments described herein, an optical transceiver module in which a control circuit for controlling a photoelectric conversion circuit can be easily reworked is provided.

Although specific embodiments have been described above, the present disclosure is not limited to the above-described embodiments. Variations, modifications, substitutions, additions, omissions, and combinations can be made to the described subject matter without departing from the scope of the present invention, and it is to be understood that such variations, modifications, substitutions, additions, omissions, and combinations obviously belong in the technical scope of the present invention.

What is claimed is:

1. An optical transceiver module comprising:
a package having a first surface and a second surface and containing a light receiving element, a light emitting element, and an optical modulator configured to modulate light that is output from the light emitting element, the first surface including a lid, the package being hermetically sealed by the lid;
a rigid circuit board having a first surface and a second surface and including a control circuit provided on the rigid circuit board, the control circuit being configured to control at least one of the light receiving element, the light emitting element, or the optical modulator; and
a flexible circuit board separated from the rigid circuit board, the flexible circuit board being provided between the rigid circuit board and the package, the flexible circuit board including a plurality of signal wires,
wherein the rigid circuit board is connected to the package via the flexible circuit board, with the first surface of the rigid circuit board facing the first surface of the package, and
the at least one of the light receiving element, the light emitting element, or the optical modulator is electrically connected to the control circuit via the plurality of signal wires.

2. The optical transceiver module according to claim 1, wherein the flexible circuit board includes a main body portion connected to the rigid circuit board, a first end portion provided on one side of the main body portion, and a second end portion provided on an opposite side from the one side of the main body portion, and
the first end portion and the second end portion are connected to the package.

3. The optical transceiver module according to claim 2, wherein the package includes a first side surface and a second side surface that are substantially perpendicular to the first surface of the package,
the first end portion is soldered to the first side surface, and
the second end portion is soldered to the second side surface.

4. The optical transceiver module according to claim 2, wherein the package includes a first side surface and a second side surface, a plane including the first side surface crossing a plane including the first surface of the package, and a plane including the second side surface crossing the plane including the first surface of the package
the first end portion is soldered to the first side surface, and
the second end portion is soldered to the second side surface.

5. The optical transceiver module according to claim 2, further comprising a plurality of spacers disposed between the first surface of the rigid circuit board and the first surface of the package, wherein a height of each of the plurality of spacers is greater than a height of a control component included in the control circuit provided on the first surface of the rigid circuit board.

6. The optical transceiver module according to claim 5, wherein the main body portion has an opening portion formed through the main body portion.

7. The optical transceiver module according to claim 6, wherein the plurality of spacers penetrate through the opening portion.

8. The optical transceiver module according to claim 1, wherein the rigid circuit board and the flexible circuit board are integrally formed.

9. An optical transceiver comprising the optical transceiver module of claim 1.

10. The optical transceiver module according to claim 2, wherein the main body portion has an opening portion formed through the main body portion.

* * * * *